US007119462B2

(12) United States Patent
Zhang et al.

(10) Patent No.: US 7,119,462 B2
(45) Date of Patent: *Oct. 10, 2006

(54) GENERATOR ROTOR CONDUCTIVE PATH FOR CONNECTING TO A TOP-TURN OF A WINDING

(75) Inventors: Jiping Zhang, Winter Springs, FL (US); Stephen T. Soto, Maitland, FL (US); Peter J. Clayton, Casselberry, FL (US); Randy E. Whitener, Oviedo, FL (US); Robert R. Messel, Winter Springs, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/014,293

(22) Filed: Dec. 16, 2004

(65) Prior Publication Data

US 2005/0200214 A1    Sep. 15, 2005

Related U.S. Application Data

(63) Continuation-in-part of application No. 10/738,835, filed on Dec. 17, 2003, now Pat. No. 7,002,270.

(60) Provisional application No. 60/549,393, filed on Mar. 2, 2004.

(51) Int. Cl.
*H02K 3/46* (2006.01)

(52) U.S. Cl. .......................................... 310/71; 310/270

(58) Field of Classification Search .................. 310/71, 310/270; 439/856, 857
See application file for complete search history.

(56) References Cited

U.S. PATENT DOCUMENTS

| 1,588,556 | A | | 6/1926 | Thompson |
| 3,422,213 | A | | 1/1969 | Webb |
| 4,204,085 | A | | 5/1980 | Chapman et al. |
| 4,368,399 | A | | 1/1983 | Ying et al. |
| 4,442,182 | A | | 4/1984 | Chart |
| 4,870,308 | A | * | 9/1989 | Sismour, Jr. .................. 310/71 |
| 4,955,239 | A | | 9/1990 | Cage et al. |

(Continued)

*Primary Examiner*—Tran Nguyen (57) ABSTRACT

An interconnecting assembly (100) for a rotor assembly of a dynamoelectric machine is provided. The interconnecting assembly may be part of an electrically conductive path generally extending from a radially inward section of the rotor assembly to a top winding of a stacked winding (128) located at a radially outward section of the rotor assembly. The interconnecting assembly may include a first connecting member (106) connected to a radial lead (104) at the inward section of the rotor assembly. This first connecting member is made up of multiple conductive leaves and includes a flexible bend (108) positioned to provide a resilient-connection relative to at least a radial direction. The interconnecting assembly may further include a second connecting member (124) mechanically connected to the first connecting member by way of the resilient connection. This second connecting member is electrically connected to the first connecting member and to the top winding. The second connecting member may include a stiffener (138) for providing support relative to an outer portion of the bend to increase stiffness and prevent buckling of the bend due to a centrifugal force that develops during operation of the machine.

24 Claims, 6 Drawing Sheets

U.S. PATENT DOCUMENTS

| | | |
|---|---|---|
| 5,039,896 A | 8/1991 | Adams et al. |
| 5,065,059 A | 11/1991 | Adams et al. |
| 5,122,696 A | 6/1992 | Shih et al. |
| 5,184,792 A * | 2/1993 | Bernhard et al. ............. 248/71 |
| 5,358,432 A | 10/1994 | Shih et al. |
| 6,236,128 B1 | 5/2001 | Dragash, Jr. |
| 6,280,265 B1 | 8/2001 | Hopeck et al. |
| 6,424,063 B1 | 7/2002 | Whitener et al. |
| 6,501,201 B1 | 12/2002 | Whitener et al. |
| 6,541,888 B1 * | 4/2003 | van Heyden et al. ....... 310/214 |
| 6,798,101 B1 * | 9/2004 | Tekawade .................... 310/71 |
| 2003/0057801 A1 | 3/2003 | Zeller et al. |
| 2004/0189118 A1 * | 9/2004 | Zhang et al. ................. 310/71 |
| 2004/0217662 A1 * | 11/2004 | Zhang et al. ................. 310/71 |

* cited by examiner

GENERATOR ROTOR CONDUCTIVE PATH FOR CONNECTING TO A TOP-TURN OF A WINDING

This application claims priority to a provisional application filed on Mar. 2, 2004, having application Ser. No. 60/549,393, which is incorporated herein by reference in its entirety, and is a Continuation-In-Part of U.S. application Ser. No. 10/738,835 filed Dec. 17, 2003 now U.S. Pat. No. 7,002,270, which is incorporated herein by reference in its entirety.

FIELD OF THE INVENTION

The present invention relates in general to a lead connecting path for an electric device and, more particularly, to a joined assembly and kit providing a lead connecting path in a generator rotor, as may be used in a power generation plant.

BACKGROUND OF THE INVENTION

Many power generation plants produce electricity by converting various forms of energy (e.g. fossil fuel, nuclear fuel, hydro or wind flow, and geothermal heat) into mechanical energy (e.g. rotation of a turbine shaft), and then converting the mechanical energy into electrical energy (e.g., by the principles of electromagnetic induction).

Some of these power generation plants, such as a fossil-fuel power generation plant, may comprise a turbine, a generator and an exciter. The turbine, generator and exciter are typically coupled to each other in axial alignment, with the generator located between the turbine and the exciter.

The turbine converts fossil fuel energy into mechanical energy in the form of turbine shaft rotation through a steam or combustion cycle. The generator then converts the rotational energy into electrical energy. The generator includes an axially extending rotor journaled in an annular stator that surrounds the rotor. The rotor has a shaft in which conductive coil windings may be axially arranged. The stator has punchings that collectively form an annular core in which conductive coil windings are positioned generally parallel with respect to the axial rotor coils. As the turbine shaft rotates the generator rotor, the exciter provides an electrical current to the rotor coil windings. The rotating electrically excited rotor creates a magnetic flux that induces an electrical current in the stationary stator coil windings. This induced electrical current constitutes the electricity that the power generation plant supplies to consumers of electricity.

One aspect of the foregoing power generation operation involves the electrical interconnection of the exciter and generator. An electrically conductive lead path is used to carry current in a closed loop configuration from the exciter, through the generator rotor coil windings, and then back to the exciter.

It is known that repeated start/stop cycling for generators of large size and weight creates substantial inertial and thermal forces that induce mechanical stresses on the various components of such generators. Components situated at some radial distance from the rotor axis may be subjected to significant centrifugal forces. Such components may include field coils disposed about the rotor and restrained from moving outward away relative to the rotor axis by restraining structures, such as adhesives, coil wedges, retaining rings and other restraining devices.

Electrically connecting structures, traditionally referred to in the art as a J-strap, that connect the field coils to terminals for establishing an electrically conductive lead path to the exciter, for example, may be subjected to the above-described forces, including forces tending to axially and/or radially displace the field coils relative to the rotor each time the generator is started or stopped. Concern has arisen that such connecting structures may become potential weak links in such generators. Lead path failure can cause electric arcing or re-routing of the electric current through nearby conductive materials. Arcing and re-routing can melt portions of the rotor shaft and otherwise damage the generator.

BRIEF DESCRIPTION OF THE DRAWINGS

The advantages of the invention will be more apparent from the following description in view of the following drawings:

FIG. 1 is a cross-sectional view of an exemplary rotor, as may be used in an electric power generator. More specifically, FIG. 1 illustrates a known lead conductive path that uses a solid plate for electromechanically interconnecting generator components therein.

DETAILED DESCRIPTION OF THE INVENTION

Figure 1:
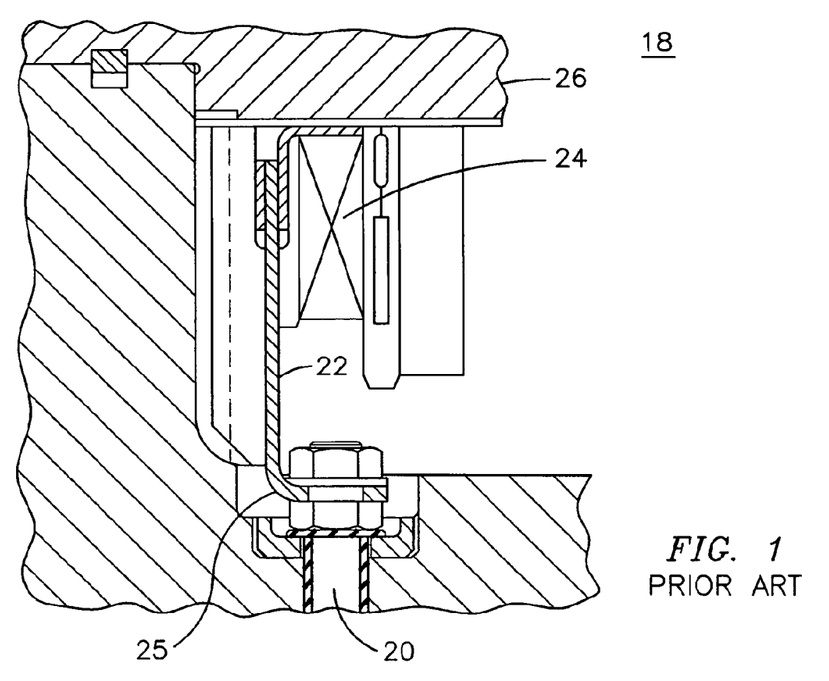

FIG. 1 shows part of an exemplary rotor 18, as may be used in an electric power generator. To better appreciate some of the issues solved by the present invention, FIG. 1 illustrates a known lead conductive path comprising a radial lead 20 attached to a solid metallic plate 22. The radial lead 20 carries an excitation current from an exciter (not shown) and the solid metallic plate 22 physically and electrically connects with a coil winding 24.

It has been found that various physical phenomena may cause or tend to cause the conductive path of FIG. 1 to sever or otherwise fail, such as at or near a curved portion 25, e.g., a bottom curved portion. One phenomenon may involve radial forces exerted on the solid plate 22. For example, the radial forces may be caused by radial expansion of a retaining ring 26 during generator start up and operation. Since the radially expanded retaining ring supports at least the winding connected to the solid plate 22, the solid plate also radially expands. This radial expansion may cause various and varying stresses and loads at the solid plate 22.

Another phenomenon may involve axial movement or pivoting of the solid plate 22, which may be caused by thermal expansion of the coil windings during generator start up and/or operation. Since the coil windings commonly have a higher thermal expansion rate than the rotor shaft and are heated by the electric current, coil windings 24 may axially expand relatively faster and to a larger extent than the rotor shaft. This thermal expansion may cause an outboard axial force on the solid plate 22, which is positioned between the coil windings 24 and the rotor shaft and must pivot about the curved bottom portion 25 to allow for the thermally-induced expansion. The terms "inboard" and "outboard" may be used to describe relative location, with the term "inboard" describing a location that is closer to the axial center of the generator rotor length than a location that is "outboard." The foregoing axial expansion, similar to the radial expansion, may cause various and varying stresses, stress concentrations, and loads at the solid plate 22. Moreover, the combined effects of the axial and radial expansions and resulting stresses, stress concentrations and loads may be additive and further compromise conductive path integrity.

Aspects of the present invention provide an improved lead conductive path configured to inhibit or prevent lead path failure that might otherwise develop, for example, at or near the bottom curved bottom portion 25 of solid plate 22. Other aspects of the present invention also provide for such an improved conductive path to be connectable to a top of a stacked winding. In yet other aspects of the present invention, a kit is provided for repairing or retrofitting a field-deployed lead conductive path that has failed or is susceptible to failure with an improved conductive path embodying aspects of the present invention.

Figure 2:
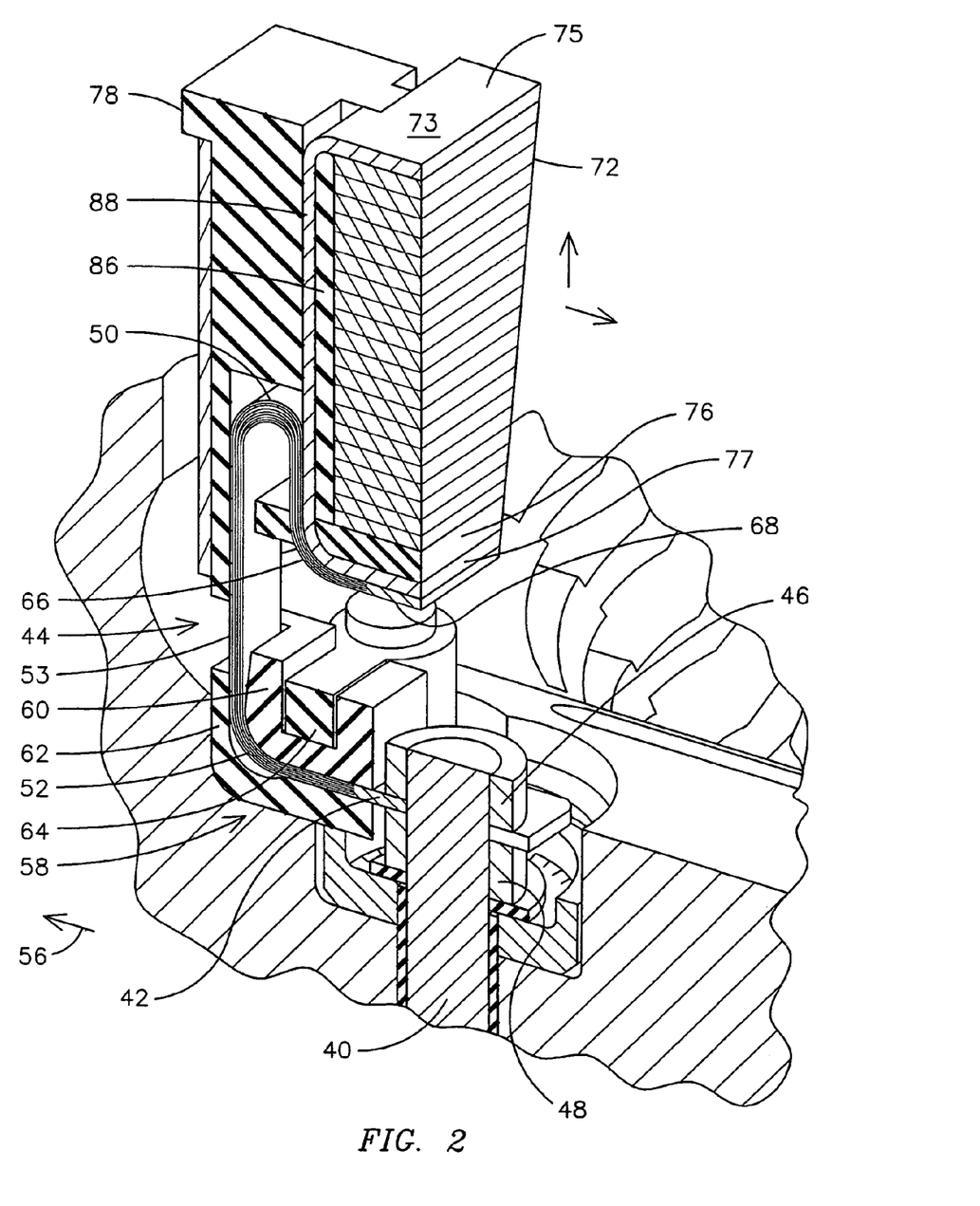
FIG. 2 is a perspective cross-sectional view of an exemplary embodiment of a lead conductive path including a joined assembly embodying aspects of the present invention.

FIG. 2 shows a perspective cross-sectional view of an exemplary embodiment of a lead conductive path embodying aspects of the present invention. The lead conductive path may comprise a radial lead 40 rigidly connected to a first leg 42 of a flexible connecting member 44 through a lead nut 46 affixing the first leg 42 against a support 48. Connecting member 44, e.g., a J-strap, in accordance with aspects of the present invention may be made up of a plurality of electrically conductive leaves, e.g., six or more copper leaves, in lieu of a solid plate. The number and/or thickness of the leaves may vary depending on the electromechanical requirements of any given application. For example, the collective cross-sectional of the leaves should be sufficiently large to appropriately carry the exciter current. Another design consideration for selecting the number and/or thickness of the leaves may be the magnitude of the mechanical stresses handled by the connecting member 44. The term "strap" or "J-strap" is not intended to limit connecting member 44 to a J-shaped looped flexible structure, rather, the term "strap" or "J-strap" is used consistent with traditional terminology, as will be understood by those skilled in the art.

Connecting member 44 may be configured to provide an outboard flexible loop 50 (e.g., a loop enabling a 180 degree turn) remote from an inboard curved region 52 of connecting member 44, e.g., inboard curved region 52 is situated between the first leg 42 and a second leg 53 of connecting member 44. First leg 42 extends generally parallel to a rotor axis 56 and is further generally orthogonal relative to the second leg 53. The outboard flexible loop 50 may preferably comprise leaves having a suitable spacing or gap between one another (e.g., such spacing may range from about 0.10 in to about 0.30 in). This inter-leave spacing avoids friction between adjacent leaves at the outboard flexible loop and avoids incremental stress that would otherwise result from interleave friction.

Figure 3:
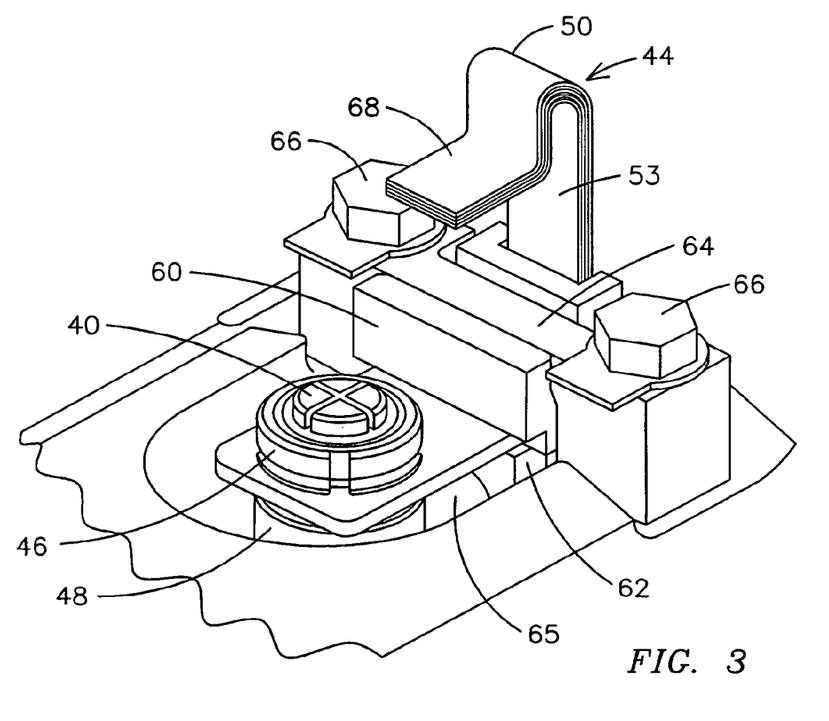
FIG. 3 is an isometric view of the embodiment of FIG. 2.

FIG. 2 further shows a support assembly 58 for supporting curved region 52 of connecting member 44. In one exemplary embodiment, (also seen in the isometric view of FIG. 3) support assembly 58 comprises a first support block 60 (e.g., a top support block), a second support block 62 (e.g., a bottom support block) and a cleat 64 received in a recess across first block 60 and bolted to the rotor shaft through suitable bolts 66 (FIG. 3). It will be appreciated that the top support block 60 provides a restraint to the curved region 52 of connecting member 44 in the presence of outward radial loads as may develop as the rotor is brought to a rotating operational speed (e.g., 3600 RPM). Conversely, the bottom support block may provide a restraint to the curved region 52 of connecting member 44 in the presence of inward radial loads as may develop as the rotor is decelerated to zero-rotation or a low speed condition from the rotating operational speed. The block and cleat components of support assembly 58 comprise electrically insulating materials, such as insulating ceramics to avoid undesirable electrical shorts and/or arcing.

In one exemplary embodiment, the installation of support assembly 58 may require creating a suitable pocket 65 (FIG. 3) in the rotor shaft (e.g., by machining or any other technique suitable to remove material from a metallic body). Pocket 65 may be configured to at least in part accommodate components of support assembly 58, such as the bottom support block 60 and cleat 64. That is, pocket 65 provides space that may be needed to fit some of the components of support assembly 58.

Connecting member 44 further comprises a second curved region 66, e.g., a top curved region between one segment of loop 50 and a third leg 68 of connecting member 44 that extends generally parallel relative to the rotor axis 56. In one exemplary embodiment specifically configured for providing a top-turn winding connection, third leg 68 is electro-mechanically connected (e.g., through brazing) to a connector 70 (FIG. 4) (e.g., a C-shaped connector or any other connector configuration defining a mouth for capturing a body, such as a stacked winding 72). Connector 70 includes a top leg 73 electromechanically connected to a top 75 of the stacked winding 72. Brazing or any other technique suitable for joining two metallic bodies may provide the connection between the top of the stacked winding and the top leg 73. For an example of a lead connect path for the bottom of the winding, see U.S. patent application Ser. No. 10/748,035, titled "Generator Rotor Lead Path For Connecting To A Field Winding", commonly assigned to the assignee of the present invention, and herein incorporated by reference in its entirety.

Connector 70 and stacked winding 72 in one exemplary embodiment comprise a joined assembly, which is jointly movable in response to axial and/or radial forces that may develop during operation of the dynamoelectric machine. The stacked winding is mechanically supported and electrically shielded by a support block 76, e.g., interposed between a bottom leg 77 of connector 70 and the bottom of stacked winding 72. This avoids electrical contact between connector 70 and the bottom of stacked winding 72. A pole face block 78 may be used for appropriately aligning the stacked winding 72 in a corresponding slot.

Figure 5:
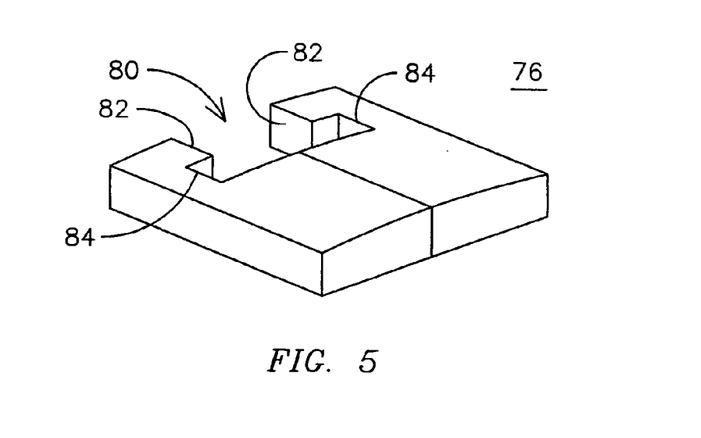
FIG. 5 illustrates an isometric view of a support block that in one exemplary embodiment provides radial support to the joined assembly, and further provides axial and circumferential support to the joined assembly.

FIG. 5 illustrates an isometric view of support block 76 that in one exemplary embodiment is configured to include a window 80 for receiving respective sections of the flexible connecting member 44 and the connector 70. The window in support block 76 is defined at least in part by shoulders 82 adapted to provide axial restraint by the joined assembly within a permissible range of axial displacement. The window in the support block may be further defined by lateral surfaces 84 arranged to provide a clearance between the window and the connecting member in the circumferential direction.

An insulator block 86 may be interposed between a radially-extending leg 88 of connector 70 and stacked winding 72. Leg 88 provides a conductive path between the top and bottom legs 73 and 77 of connector 70. In one exemplary embodiment, leg 88 and top leg 77 of the connector extend co-planarly relative to one another prior to installation of a kit for providing a lead connection from radial lead 40 to the top of the stacked winding. In this embodiment, top leg 77 may be bent at an angle (e.g., 90 deg.) relative to leg 88 during installation of the kit.

The foregoing arrangement may be used when a top-turn winding connection is desired. That is, connector 70 and support block 76 together with connecting member 44 allow providing a top-turn connection to the field winding. It will be appreciated that a bottom-turn connection would not require use of connector 70 and support block 76. Thus, aspects of the present invention advantageously allow configuring an improved lead conductive path to enable a top-turn connection with the addition of just a few components, e.g., connector 70 and support block 76.

Figure 4:
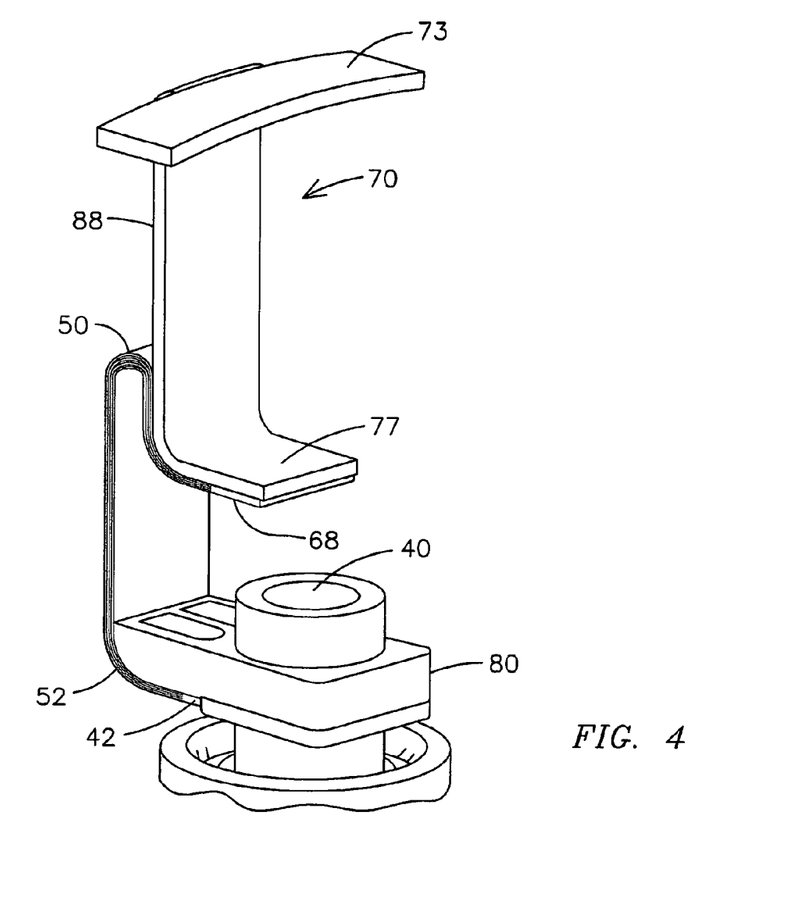
FIG. 4 is an isometric view of another exemplary embodiment of a conductive path embodying further aspects of the present invention.

FIG. 4 is an isometric view of another embodiment of a lead conductive path embodying aspects of the present invention. In this embodiment in lieu of using support assembly 58 made up of various components, a single support plate 80 may be used for rigidly supporting curved region 52 relative to outward radial loads and for affixing the first leg 42 to radial lead 40. This embodiment does not need rotor machining to create a pocket for accommodating some of the components employed by support assembly 58 and may be used in retrofit applications where machining of the rotor shaft may not be practical. This embodiment further does not employ any cleat bolts and associated bolt holes, which may simplify some retrofitting operations and may be conducive to preserve the structural integrity of the rotor. In FIG. 4, stacked winding 72 (FIG. 2) captured by connector 70 and associated blocks have been omitted for simplicity of illustration.

Figure 6:
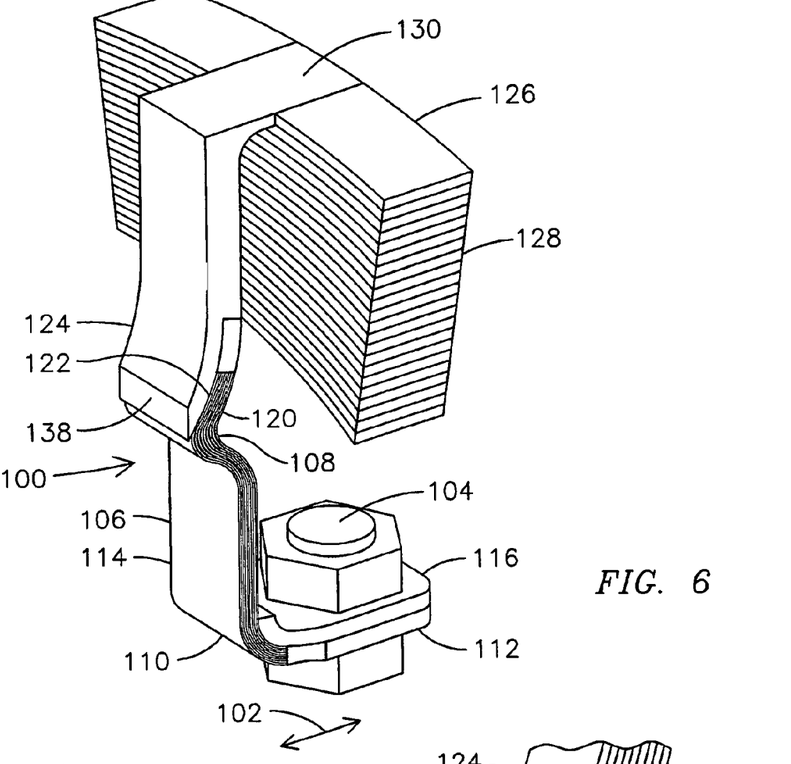
FIG. 6 is an isometric view of an embodiment of an interconnecting assembly including a flexible bend embodying aspects of the present invention.

FIG. 6 is an isometric view of an embodiment of an interconnecting assembly 100 embodying aspects of the present invention. The inventors of the present invention have innovatively recognized an interconnecting assembly that interalias allows for appropriately balancing some of the basic counter-opposing physical constraints that prior to the present invention have provided little or no relief for achieving a desired design versatility in the conductive path enabled by the interconnecting assembly.

For example, in some known designs, the designer was essentially constrained to employ either a solid connecting member or relatively thick members (e.g., in the order of 4 mm to 8 mm) over the full radial length of the connecting path in order to meet the stiffness requirements for self-supporting centrifugal loads that develop during operation of the machine. However, the use of a solid member or relatively thick members, even if configured to include some type of curved section, results in limitations for flexibly accepting axial and/or radial displacements that develop during the operation of the machine and meeting the specified requirements for the low-cycle fatigue life of the conductive path. Low cycle fatigue, commonly referred to as LCF, is the structural fatigue of rotating components brought on by the routinely imposing and relaxing of a centrifugal force caused by variations in rotational speed, such as cycling from an idling speed to an operational speed and vice versa.

Aspects of the present invention provide a conductive path that in one exemplary embodiment may be made up of two connecting members having different (e.g., complementary) mechanical characteristics with respect to one another that allow for balancing the above-noted counter-opposing constraints. That is, being able to meet the stiffness requirements for the conductive path while affording a sufficient degree of flexibility to accept axial and radial forces and achieving the LCF requirements of the conductive path.

In one exemplary embodiment, one of the connecting members (e.g., a first connecting member 106) in part extends over a first portion of the radial length of the connecting path. This first connecting member may comprise a plurality of relatively thin conductive leaves (e.g., in the order of 0.8 mm) that is sufficiently flexible and may be configured to include a resilient bend 108 for accepting axial and/or radial displacements that develop during operation of the machine and is beneficial for meeting the low-cycle fatigue life requirements of the machine.

The second of the connecting members (e.g., connecting member 124) may be a relatively rigid member for completing the remaining radial length of the connecting path. This rigid member may include a stiffener 138 positioned to provide support and increased stiffness for the resilient bend of the flexible connecting member. This support feature prevents buckling conditions that could otherwise develop at the bend of the flexible connecting member when subjected to a centrifugal load. Thus, the inventors of the present invention have innovatively recognized an interconnecting assembly that meets a long felt need for rotor generators, such as being able to provide an interconnecting assembly that is sufficiently stiff to self-support a centrifugal load and meets or exceeds the LCF life requirements of the conductive path notwithstanding of being subjected to relatively large radial and axial displacements.

This embodiment may be particularly useful for applications where the spacing (as represented by line 102) between a radial lead 104 and a neighboring rotor structure, such as a pole phase (not shown) is relatively tight (e.g., in the order of 82 mm). It should be appreciated that the footprint constraints faced by the designer of the interconnecting assembly impose substantial design challenges since some design options (that could theoretically be feasible if the footprint available for the connecting path was not subject to space limitations) are just not available. Thus, this is not just a simple matter of picking a design choice from a large universe of choices but rather being able to recognize an improved interconnecting assembly that cleverly balances a myriad of constraints encountered in the environment of a rotor generator.

As noted above, the flexible connecting member 106 may be configured to provide a radially and axially resilient bend 108 remote from an inboard curved region 110 of connecting member 106, e.g., inboard curved region 110 is situated between a first leg 112 and a second leg 114 of connecting member 106.

FIG. 6 further shows a support plate 116 for supporting curved region 110 of connecting member 106. It will be appreciated that support plate 116 provides a restraint to the curved region 110 of connecting member 106 in the presence of outward radial loads as may develop as the rotor is brought to a rotating operational speed (e.g., 3000 RPM).

A third leg 120 of connecting member 106 includes a stiffener-interface section 122 that in one exemplary embodiment may be a curved section. It will be appreciated that the stiffener interface section need not be a curved section since any other geometry that allows transitioning the third leg from curving at the bend 108 to the radial direction may be employed. For example, the stiffener interface section could include a taper section in lieu of a curved section to allow such a transition.

Figure 7:
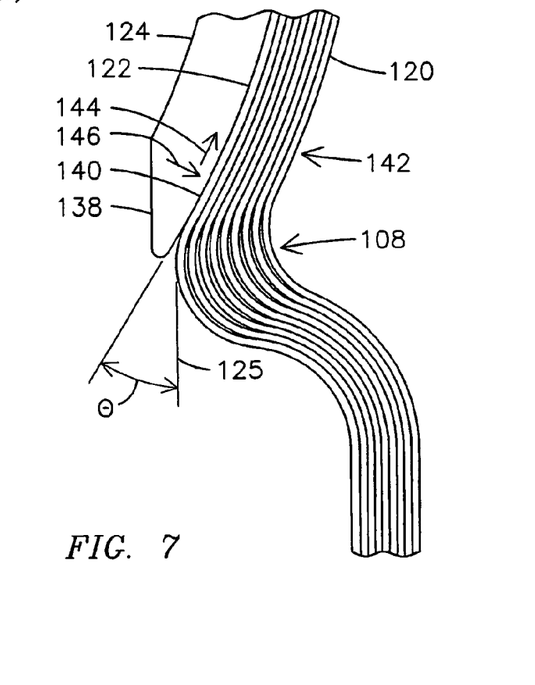
FIG. 7 illustrates exemplary structural details for the flexible bend of FIG. 6.

As shown in FIG. 7, the leaves in the bend 108 have a suitable spacing or gap between one another (in one exemplary embodiment such spacing may range from about 0.10 in. to about 0.30 in.). This inter-leaf spacing avoids friction between adjacent leaves at the outboard bend and avoids incremental stress that would otherwise result from inter-leaf friction.

It will be appreciated that the actual number and/or thickness of the leaves that may be used for constructing the connecting member 106 may vary depending on the electromechanical requirements of any given application. For example, the collective cross-sectional area of the leaves should be sufficiently large to appropriately carry the exciter current. Another design consideration for selecting the number and/or thickness of the leaves may be the magnitude of the mechanical stresses handled by the connecting member 106.

Returning to FIG. 6, in one exemplary embodiment configured for providing a top-turn winding connection, the stiffener-interface section 122 may be electrically and fixedly connected (e.g., through brazing) to the second connecting member 124, such as a solid member, in turn electrically and fixedly connected to a top turn 126 of a field winding 128 (e.g., a stacked winding) through an interface plate 130. Brazing or any other technique suitable for joining two metallic bodies may provide the connection between the top turn of the field winding and the interface plate.

Figure 8:
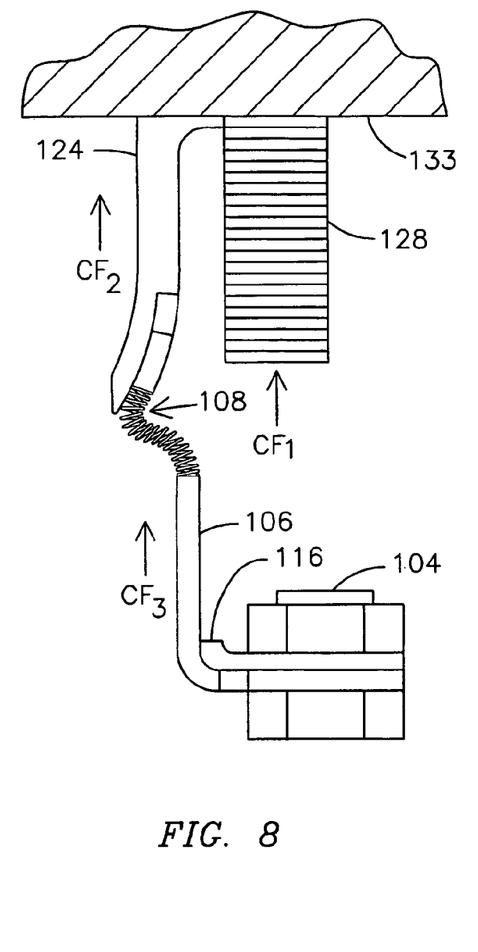
FIG. 8 is a schematic conceptual representation of an interconnecting assembly embodying aspects of the present invention that should facilitate a better understanding of some of the advantages provided by the present invention.

FIG. 8 is a schematic conceptual representation of an interconnecting assembly embodying aspects of the present invention that should facilitate a better understanding of some of the advantages provided by the present invention. For example, it will be appreciated that bend 108 may be conceptualized as providing a relatively weak spring connection along the radial direction between the first connecting member 106 and the second connecting member 124. This spring connection allows to substantially uncouple some of the centrifugal loads that otherwise would have to be carried by the radial lead 104 and support plate 116. FIG. 8 illustrates a diagram of the centrifugal loads that may act on the interconnecting assembly. CF1 represents a portion of the centrifugal load due to the rotating mass of the stacked winding 128. As will be appreciated by those skilled in the art, although a retaining ring 133 supports the bulk of the load due to the rotating mass of the stacked winding, CF1 can still reach a value that in previous designs is anything but negligible (e.g., in the order of 2000 pounds of force). CF2 represents a load due to the mass of the second connecting member 124. CF3 represents a load due to the mass of the first connecting member 106.

The total sum of the centrifugal loads is represented by CFt=CF1+CF2+CF3. As noted above and in accordance with aspects of the present invention, bend 108 effectively uncouples some of the centrifugal loads that otherwise would be carried by the radial lead 104 and support plate 106. In one exemplary embodiment due to such uncoupling, CF1*=0, CF2*=<1% CF2 and CF3*=CF3, where the asterisk indicates the load values that take into account the degree of uncoupling due to the spring connection provided by bend 108. Accordingly, the total sum of centrifugal loads due to the spring connection provided by bend 108 becomes CF*t=<1% CF2+CF3.

Exemplary normalized values of the centrifugal loads may be CF1=2 units of force; CF2=1 unit of force; CF3=0.5 units of force. Thus, in the prior art CFt=3.5 units of force whereas in accordance with aspects of the present invention C*Ft=0.501 units of force. This represents a significant reduction in the level of centrifugal load that is carried by the radial lead 104 and support plate 116 considering that an exemplary magnitude of the centrifugal load for CF1 alone may be in the order of a couple of thousands of pounds of force. This feature may allow reducing the strength requirements for the support plate 112 and allow use of relatively more conductive material, such as ZrCu, in lieu of relatively higher strength materials, such as steel or copper alloys.

Figure 9:
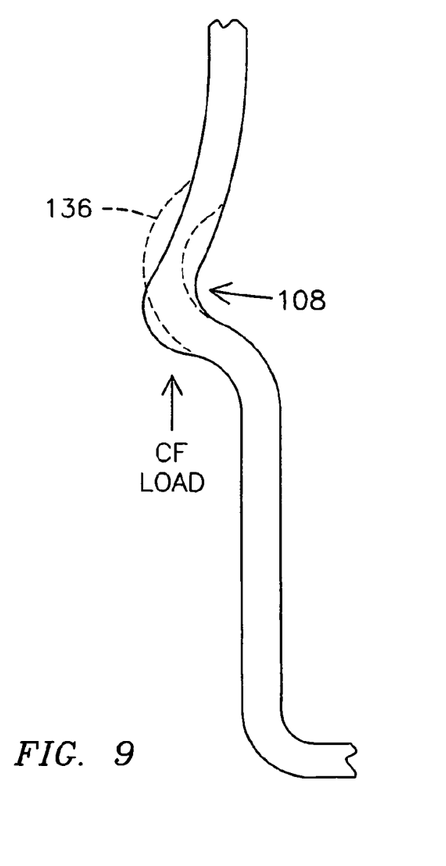
FIG. 9 shows a schematic representation of a buckling condition that is prevented by a stiffener member that is part of the interconnecting assembly of FIG. 6.

FIG. 9 shows a schematic representation of a buckling condition (exemplarily represented by dashed line 136) that is prevented by the stiffener 138 (FIG. 7) of interconnecting member 124. Stiffener 138 allows for providing support relative to an outer portion 140 of bend 108 to increase stiffness and prevent buckling of the bend due to the centrifugal force that develops during operation of the machine.

In one exemplary embodiment, the stiffener 138 is arranged relative to the stiffener-interface section 122 of the third leg 120 so that the conductive leaves (as they extend to form a radially outboard section of the bend 108 (e.g., bend section 142)) may extend at an angle Θ relative to the radial direction. In one exemplary embodiment, it is contemplated that this angle may broadly range from about 10 degrees to about 45 degrees relative to the radial direction represented by a vertical line 125. In another exemplary embodiment, it is believed that this angle may preferably range from about 20 degrees to about 30 degrees. It will be appreciated that the present invention should not be limited to the foregoing exemplary ranges since the specific value of the angle Θ relative to the radial direction may be chosen based on the requirements for a given application. This angular support arrangement results in a tangential support component 144 and a normal support component 146. The normal support component increases stiffness and prevents buckling of the bend 108 that could otherwise develop, as depicted in FIG. 9, due to the centrifugal force that develops during operation of the machine. This angular support also improves mechanical stability of the interconnecting assembly during operation of the machine.

Figures 10, 11, 12:
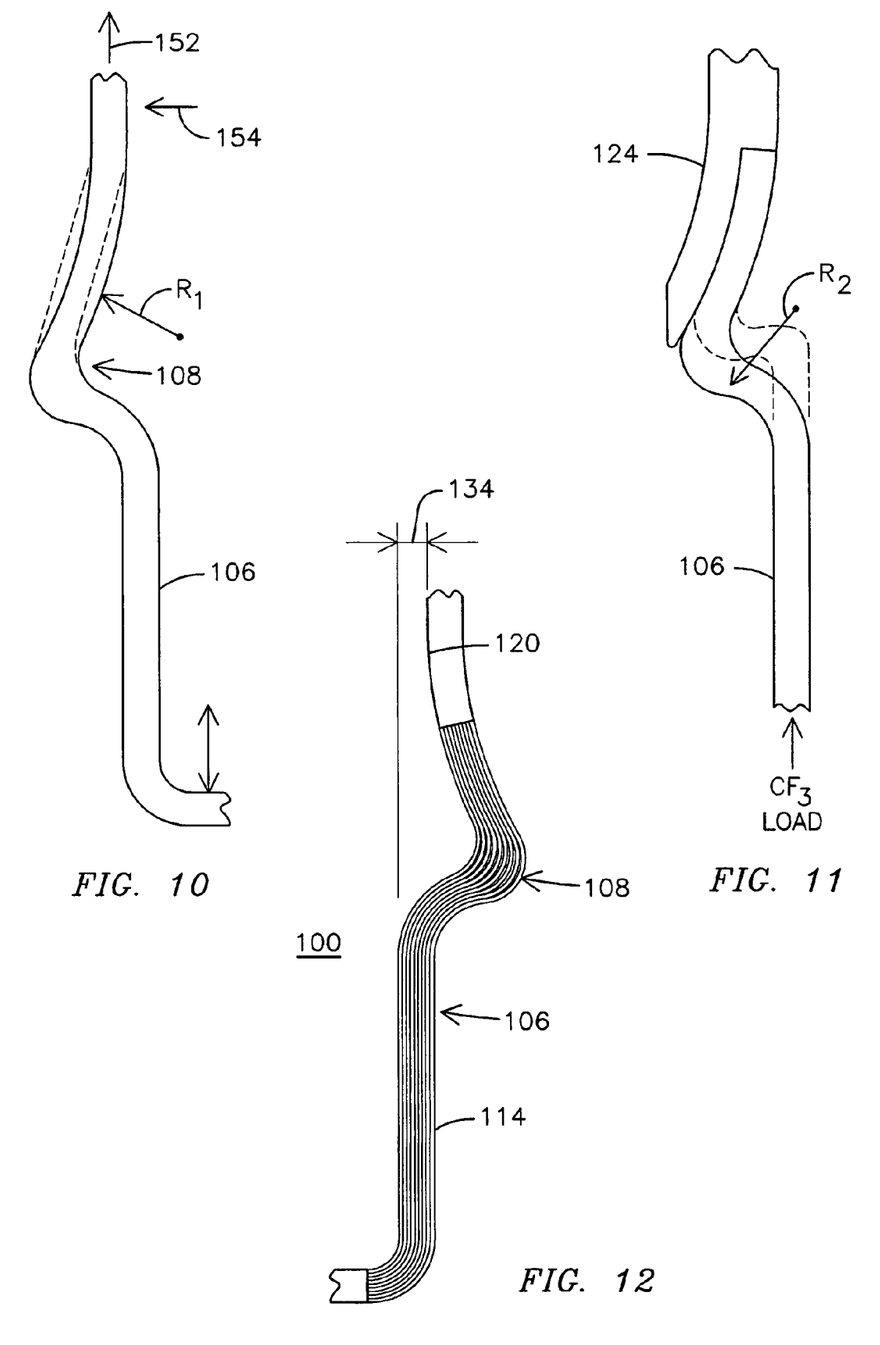
FIGS. 10 and 11 show respective schematics for illustrating additional aspects provided by the flexible bend of the interconnecting assembly of FIG. 6.
FIG. 12 represents an exemplary embodiment that enables the interconnecting assembly to provide an axial offset between certain structural components thereof.

FIGS. 10 and 11 show respective schematics for illustrating additional aspects in connection with bend 108. More particularly, the bend 108 is arranged so that an effect of an axial and/or a radial displacement (as represented by arrows 150 and 152) on a first radius of curvature (e.g., radius R1) of the bend has one type of effect. In this case, as represented in FIG. 10 by the dashed line, radius R1 tends to open when subjected to axial and/or radial displacements. Conversely, the centrifugal force due to the rotating mass of connecting member 106, e.g., CF3 in FIG. 11, has an opposite type of effect on a second radius of curvature (e.g., radius R2) of the bend. In this case, radius R2 tends to close in the presence of the centrifugal load CF3. The effects on radii R1 and R2 are thus opposed to one another, thereby reducing concentration of stress along the bend. Accordingly, the arrangement of the bend 108 is helpful for offsetting or reducing some of various stress effects that could affect the reliability of the lead conductive path. Finite Element Analysis (FEA) indicates that the net effect of the ability of the outboard bend 108 for offsetting or reducing stress effects allow the lead conductive path to tolerate relatively large loading due to radial and axial displacements, as well as meeting the start/stop cycling requirements over the designed low cycle fatigue (LCF) life of the conductive path.

As shown in FIG. 12, one can optionally configure the interconnecting assembly 100 to provide an outboard axial offset (represented by axial gap 134) between the second leg 114 and the third leg 120 of the flexible connecting member 106. In one exemplary embodiment, the axial gap 134 may range from approximately 0 mm to approximately 20 mm. The axial offset allows for incremental flexibility in the bend 108 and reduces the moment that develops relative to the radial lead.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim:

1. An interconnecting assembly for a rotor assembly of a dynamoelectric machine, said interconnecting assembly being part of an electrically conductive path generally extending from a radially inward section of the rotor assembly to a top winding of a stacked winding located at a radially outward section of the rotor assembly, the interconnecting assembly comprising:
a first connecting member connected to a radial lead at the inward section of the rotor assembly, said first connecting member comprising multiple conductive leaves and including a flexible bend positioned to provide a resilient-connection relative to at least a radial direction; and
a second connecting member mechanically connected to said first connecting member by way of said resilient connection, said second connecting member electrically connected to said first connecting member and to said top winding, said second connecting member including a stiffener for providing support relative to an outer portion of said bend to increase stiffness and prevent buckling of the bend due to a centrifugal force that develops during operation of the machine.

2. The interconnecting assembly of claim 1 wherein said bend further provides a resilient-connection relative to an axial direction perpendicular to said radial direction.

3. The interconnecting assembly of claim 1 wherein said bend is arranged so that an effect of an axial and/or a radial displacement on a first radius of curvature of said bend and an affect of a centrifugal force on a second radius of curvature of said bend are opposed to one another, thereby reducing concentration of stress at said bend.

4. The interconnecting assembly of claim 1 further comprising a gap between adjacent leaves in said bend.

5. The interconnecting assembly of claim 1 wherein said first connecting member comprises a first leg rigidly and electrically connected to the radial lead, said first leg generally extending along an axial direction.

6. The interconnecting assembly of claim 5 wherein said first connecting member further comprises a second leg connected to said first leg through a curved section, said second leg generally extending along the radial direction.

7. The interconnecting assembly of claim 6 wherein said first connecting member further comprises a third leg connected to said second leg through said bend.

8. The interconnecting assembly of claim 1 wherein a section of the multiple conductive leaves in correspondence with the outer section of the bend extend at an angle relative to the radial direction.

9. The interconnecting assembly of claim 8 wherein said angle ranges from about 10 degrees to about 45 degrees relative to the radial direction.

10. The interconnecting assembly of aim 8 wherein said angle ranges from about 20 degrees to about 30 degrees relative to the radial direction.

11. The interconnecting assembly of claim 7 wherein said third leg comprises an outboard axial offset relative to said second leg.

12. The interconnecting assembly of claim 11 wherein said axial offset ranges from about 0 mm to about 20 mm.

13. A dynamoelectric machine comprising a winding located at a radially outward section of a rotor assembly, said machine comprising:
a conductive path generally extending from a radially inward section of the rotor assembly to said winding, said conductive path comprising a first connecting member connected to a radial lead at the inward section of the rotor assembly, said first connecting member comprising multiple conductive leaves and including a flexible bend positioned to provide a resilient-connection relative to at least a radial direction, said conductive path further comprising a second connecting member mechanically connected to said first connecting member by way of said resilient connection, said second connecting member electrically connected to said first connecting member and to said winding, said second connecting member including a stiffener for providing support relative to an outer portion of said bend to increase stiffness and prevent buckling of the bend due to a centrifugal force that develops during operation of the machine.

14. The machine of claim 13 wherein said bend further provides a resilient-connection relative to an axial direction perpendicular to said radial direction.

15. The machine of claim 13 wherein said bend is arranged so that an effect of an axial and/or a radial displacement on a first radius of curvature of said bend and an effect of a centrifugal force on a second radius of curvature of said bend are opposed to one another, thereby reducing concentration of stress at said bend.

16. The machine of claim 13 further comprising a gap between adjacent leaves in said bend.

17. The machine of claim 13 wherein said first connecting member comprises a first leg rigidly and electrically connected to the radial lead, said first leg generally extending along an axial direction.

18. The machine cit claim 17 wherein said first connecting member further comprises a second leg connected to said first leg through a curved section, said second leg generally extending along the radial direction.

19. The machine of claim 18 wherein said first connecting member further comprises a third leg connected to said second leg through said bend.

20. The machine of claim 13 wherein a section of the multiple conductive leaves in correspondence with the outer section of the bend extends at an angle relative to the radial direction.

21. The machine of claim 20 wherein said angle ranges from about 10 degrees to about 45 degrees relative to the radial direction.

22. The machine of claim 20 wherein said angle ranges from about 20 degrees to about 30 degrees relative to the radial direction.

23. The machine of claim 19 wherein said third leg comprises an outboard axial offset relative to said second leg.

24. The machine of claim 23 wherein said axial offset ranges from about 0 mm to about 20 mm.

* * * * *